(12) United States Patent
Kataoka et al.

(10) Patent No.: US 7,191,882 B2
(45) Date of Patent: Mar. 20, 2007

(54) POWER TRANSMITTING APPARATUS (75) Inventors: Makoto Kataoka, Inasa-gun (JP); Satoru Kashiwagi, Inasa-gun (JP); Ryo Egawa, Inasa-gun (JP); Yuusuke Suzuki, Inasa-gun (JP)

(73) Assignee: Kabushiki Kaisha F.C.C. (JP)

( * ) Notice: Subject to any disclaimer, the term of this patent is extended or adjusted under 35 U.S.C. 154(b) by 83 days.

(21) Appl. No.: 11/032,945

(22) Filed: Jan. 11, 2005

(65) Prior Publication Data
US 2005/0150736 A1 Jul. 14, 2005

(30) Foreign Application Priority Data

| Jan. 14, 2004 | (JP) | ............................. 2004-007244 |
| Apr. 16, 2004 | (JP) | ............................. 2004-121465 |
| Aug. 24, 2004 | (JP) | ............................. 2004-244221 |

(51) Int. Cl.
*F16D 43/21* (2006.01)
*F16D 13/04* (2006.01)

(52) U.S. Cl. .................. 192/54.5; 192/70.23

(58) Field of Classification Search ............... 192/54.5, 192/56.6, 70.23, 89.21
See application file for complete search history.

(56) References Cited

U.S. PATENT DOCUMENTS

| 2,799,375 | A |   | 7/1957 | Forster |   |
| 3,100,974 | A | * | 8/1963 | Wilson et al. | ................. 464/46 |
| 3,239,042 | A | * | 3/1966 | Jandasek | .................... 192/52.5 |
| 4,762,021 | A | * | 8/1988 | Teraoka | .................. 74/665 GA |
| 5,617,938 | A | * | 4/1997 | Tsukada et al. | ............. 192/54.5 |
| 2006/0096829 | A1 | * | 5/2006 | Kataoka et al. | ............. 192/54.5 |

FOREIGN PATENT DOCUMENTS

| DE | 10 81 772 |   | 5/1960 |
| EP | 1 058 018 A2 |   | 12/2000 |
| JP | 60001428 A | * | 1/1985 |
| JP | 61 096222 |   | 9/1986 |
| JP | 61294220 A | * | 12/1986 |
| JP | 02-150517 |   | 6/1990 |

* cited by examiner

*Primary Examiner*—Richard M. Lorence
(74) *Attorney, Agent, or Firm*—Harness, Dickey & Pierce, P.L.C.

(57) ABSTRACT

A power transmitting apparatus which can reduce the number of parts in the apparatus and simplify the structure of the apparatus and thus reduce the manufacturing cost of the apparatus as well as reduce the size of the apparatus when compared with its torque transmitting capacity. The apparatus has a clutch housing (2), a clutch member (4), a pressure plate (5), stopper portions (5b) each fitting in a recess (4a) formed on the inner peripheral wall of the clutch member (4) and limiting the rotation of the pressure plate (5). When a rotational force inputted to a gear (1) is transmitted to or cut off from a shaft (3), via pressure-contact or release between the driving clutch plates (6) and driven clutch plates (7), the stopper portions (5b) and the recesses (4a) are provided with pressure-contact assisting cams to increase the pressure-contacting force between the driving clutch plates (6) and driven clutch plates (7) or provided with back-torque limiting cams to release the connection between the driving clutch plates (6) and the driven clutch plates (7).

5 Claims, 5 Drawing Sheets

POWER TRANSMITTING APPARATUS

CROSS-REFERENCE TO RELATED APPLICATION

This application claims priority to Japanese Patent Application No. 2004-007244, filed Jan. 14, 2004, Japanese Patent Application No. 2004-121465, filed Apr. 16, 2004, and Japanese Patent Application No. 2004-244221, filed on Aug. 24, 2004, which applications are herein expressly incorporated by reference.

FIELD OF THE INVENTION

The present invention relates to a power transmitting apparatus for arbitrarily transmitting or cutting off a rotational force of an input member to or from an output member.

BACKGROUND OF THE INVENTION

In general, a power transmission apparatus for a four wheel drive vehicle can transmit the driving force of an engine and transmission to the rear wheels and arbitrarily to the front wheels. Thus, it is possible to arbitrarily select a two wheel driving mode where the power transmission to the front wheels is cut off or a four wheel driving mode where the power transmission to the front wheels is achieved. In such a power transmitting apparatus, it has an input member connected to an engine and transmission, an output member selectively connected to selectively driven wheels (e.g. front wheels), and clutch members connected to the output member. The power can be transmitted by pressure-contacting a plurality of driving clutch plates mounted on the input member and a plurality of driven clutch plates mounted on a clutch member. The power can be cut off by releasing the plates.

Japanese Laid-open Patent Publication No. 150517/1990 discloses providing cam members near an output shaft. The output member adds a pressure-contact assisting function to improve the pressure-contacting force of both driving and driven clutch plates during power transmission. Also, it provides a back-torque limiting function to release the clutch plates of the input and output sides when the rotation speed of the output member has exceeded that of the input member. According to this power transmitting apparatus of the prior art, cam members are arranged between the shaft and the clutch member. Thus, the pressure plate ("clutch pressure plate" in the cited reference) is moved toward a direction where both clutch plates are strongly pressure-contacted during power transmission. On the contrary, the pressure plate is moved in an opposite direction where both clutch plates are released when a back-torque is achieved.

However in the power transmitting apparatus of the prior art, since the cam members function as the pressure-contact assistance, and the back-torque limiter is positioned near the shaft as the output member, a problem exists in that the surface pressure applied to the cam surfaces of the cam members would be overloaded. Accordingly, it is necessary to manufacture the cam member from material having high rigidity, such as a forged article, so that it has sufficient durability against the overload. Accordingly, this increases the cost of the power transmitting apparatus. Furthermore, the addition of the cam members increases the number of parts that form the apparatus and reduces the workability of assembling the complicated apparatus which would further increase the manufacturing cost.

The power transmitting apparatus of the prior art is formed with stopper portions to prevent rotation of the pressure plate relative to the clutch member in a state where the pressure plate is mounted on the clutch member. The stopper portions are formed to project from the pressure plate and fit into recesses formed on the inner peripheral wall of the clutch member to limit the rotation of the pressure plate relative to the clutch member. In addition, the outer peripheral surface of the clutch member is formed with splines to fit with driven clutch plates.

SUMMARY OF THE INVENTION

It is an object of the present invention to provide a power transmitting apparatus which reduces the number of parts of the apparatus. The present invention simplifies the structure of the apparatus and thus reduces the manufacturing cost of the apparatus as well as reduces the size of the apparatus as compared with its torque transmitting capacity.

To achieve the object of the present invention, the applicant provides the pressure-contact assisting function and the back-torque limiting function at portions where the recesses of the clutch member and fitting portions between the clutch member and the driven clutch plates are conventionally formed.

According to the present invention, a power transmitting apparatus comprises a clutch housing rotatable together with an input member and a plurality of driving clutch plates. A clutch member is connected to an output member and has a plurality of driven clutch plates alternately arranged between the driving clutch plates of the clutch housing. A rotational force inputted to the input member can be transmitted to or cut off from the output member via pressure-contact or release between the driving clutch plates and driven clutch plates. The clutch member includes pressure-contact assisting cams to increase the pressure-contacting force between the driving clutch plates and driven clutch plates when transmission of the rotational force inputted to the input member to the output member is achieved. Also, the clutch member includes back-torque limiting cams to release the connection between the driving clutch plates and the driven clutch plates when the rotation speed of the output member has exceeded that of the input member.

According to the present invention, the power transmitting apparatus further comprises a pressure plate mounted on the clutch member. The pressure plate is moveable in an axial direction of the clutch member to carry out the pressure-contact or release of the driving clutch plates and the driven clutch plates via the axial movement relative to the clutch member. Stopper portions project from the pressure plate and are fitted in recesses formed on the inner peripheral surface of the clutch member to limit the rotation of the pressure plate relative to the clutch member. The recesses formed on the clutch member and the stopper portions fitted in the recesses are formed with the pressure-contact assisting cams. The cams move the pressure plate toward the clutch member to increase the pressure-contacting force between the driving clutch plates and driven clutch plates when a rotational force inputted to the input member is transmitted to the output member. Also, the clutch member includes back-torque limiting cams to move the pressure plate away from the clutch member to release the connection between the driving clutch plates and the driven clutch plates when the rotation speed of the output member has exceeded that of the input member.

According to the present invention, in the power transmitting apparatus, the pressure-contact assisting cams and the back-torque limiting cams are formed at fitting portions of clutch member where the driven clutch plates are fitted.

According to the present invention, in the power transmitting apparatus, the fitting portions of the clutch member are formed by a member separate from the clutch member and have higher rigidity than that of the clutch member.

According to the present invention, in the power transmitting apparatus, at least one of the pressure-contact assisting cams or back-torque limiting cams is surface treated to improve the wear resistance and durability.

According to the present invention, since the clutch member formed with the recesses or the fitting portions is given the pressure-contact assisting function and the back-torque limiting function, it is possible to eliminate any new additional parts such as a cam member etc., and thus to reduce the manufacturing cost, the number of the parts and the size of the apparatus.

According to the present invention, since the conventional recesses and the stopper portions are given the pressure-contact assisting function and the back-torque limiting function, it is possible to eliminate any new additional parts such as a cam member etc., and thus to reduce the manufacturing cost, the number of the parts and the size of the apparatus.

According to the present invention, since the fitting portions between the clutch member and the driven clutch plates are given the pressure-contact assisting function and the back-torque limiting function, it is possible to increase the pressure-contacting force or releasing force relative to the driving clutch plates in accordance with an increase in the number of the driven clutch plates.

According to the present invention, since the fitting portions of the clutch member are formed by a member separate from the clutch member and has higher rigidity than that of the clutch member, it is possible to improve the durability of the apparatus although an offset load applied to the fitting portions.

According to the present invention, since at least one of the pressure-contact assisting cams or the back-torque limiting cams is surface treated to improve the wear resistance and durability, it is possible to obtain a good camming action and thus to extend the life of the power transmitting apparatus.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

The following description of the preferred embodiment(s) is merely exemplary in nature and is in no way intended to limit the invention, its application, or uses.

Figure 1:
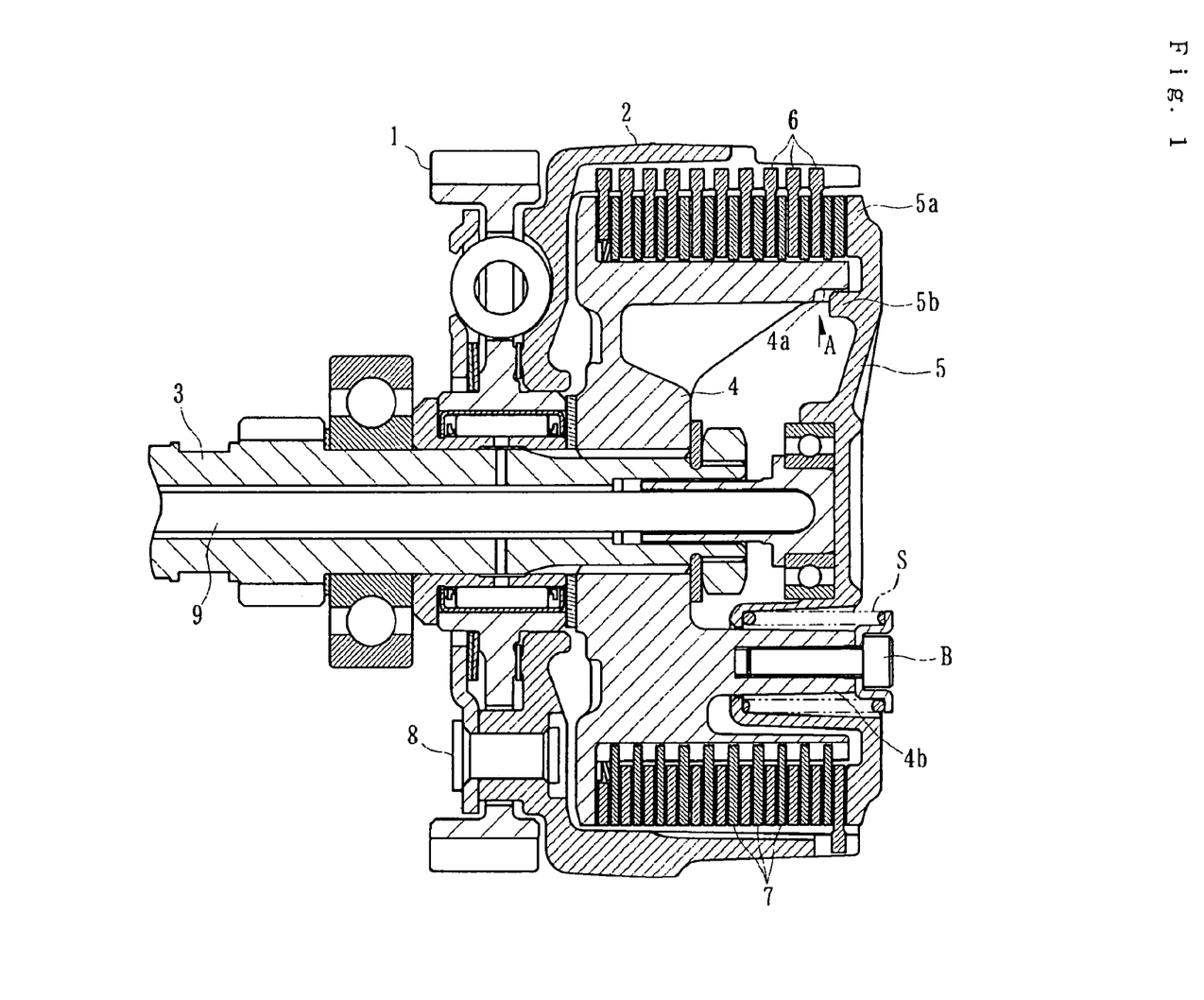
FIG. 1 is a longitudinal section view of a power transmitting apparatus according to a first embodiment of the present invention.

A power transmitting apparatus of a first embodiment of the present invention is mounted on a vehicle such as a four wheel driving vehicle to arbitrarily transmit or cut off the driving force of an engine and transmission to or from the front wheels. As shown in FIG. 1, the power transmitting apparatus of the present invention comprises a clutch housing 2 on which a gear 1 is mounted as an input member. A clutch member 4 is connected to a shaft 3 as an output member. A pressure plate 5 is mounted on the clutch member 4 at the right end (in view of FIG. 1). Driving clutch plates 6 are connected to the clutch housing 2 and driven clutch plates 7 are connected to the clutch member 4.

The gear 1 is rotated around the shaft 3 by a driving force (rotational force) transmitted from the engine and connected to the clutch housing 2 via rivets 8, etc. The clutch housing 2 is a cylindrical casing member opened at the right end and is provided with a plurality of driving clutch plates 6 on its inner peripheral surface. Each of the driving clutch plates 6 is formed as a substantially annular plate member and is rotated together with the clutch housing 2.

The clutch member 4 is formed as a cylindrical casing member opened at the right end and adapted to be received within the clutch housing 2. The shaft 3 passes through the center of the clutch member 4 and is connected thereto via a spline connection and thus is rotated by the clutch member 4. Axially extending splines are formed on the outer peripheral surface of the clutch member 4 and the driven clutch plates 7 are fitted on the splines.

The driven clutch plates 7 are alternately arranged or interleaved with the driving clutch plates 6. Thus, clutch plates 6 and 7 are adjacent each other and can be pressure-contacted or released. Both clutch plates 6 and 7 may slide axially of the clutch member 4 and thus pressure-contacted each other when pushed by the pressure plate 5 toward (or in) a left direction (FIG. 1) so that the rotational force can be transmitted to the clutch member 4 and the shaft 3. On the contrary, when releasing the pressure of the pressure plate 5, the plates 6, 7 are also released from each other and the clutch member 4 cannot follow the rotation of the clutch housing 2. The clutch member 4 is stopped so that power cannot be transmitted to the shaft 3.

In this case, it should be noted that "release" of the clutch plates 6 and 7 means a condition where the pressure-contact is lost and thus the clutch member 4 does not follow the rotation of the clutch housing 2. Here, a condition exists where the driving clutch plates 6 slide on the driven clutch plates 7. Thus, it is out of the question whether there is any clearance between the clutch plates 6 and 7.

The pressure plate 5 has a disc configuration closing the opening (the right end) of the clutch member 4. The pressure plate 5 is normally urged toward a left direction by the clutch spring S. Thus, the urging of the pressure plate 5 is achieved by the clutch spring S arranged between a boss portion 4b, projecting from the clutch member 4 and extending through the pressure plate 5, and a head of a bolt B screwed into the boss portion 4b.

Thus the peripheral edge portion 5a of the pressure plate 5 abuts the clutch plate 7 positioned at the rightmost position. The clutch plates 6 and 7 are normally pressure-contacted against each other by the clutch spring S. Accordingly, the clutch housing 2 and the clutch member 4 are kept in a normally connected condition so that the gear 1 can rotate the shaft 3 when a rotational force is inputted to the gear 1.

However the pressure-contact force between the driving and driven clutch plates 6 and 7 can be released when a driver of the vehicle operates a push rod 9. The push rod 9 is moved toward a right direction (FIG. 1) to move the pressure plate 5 toward a right direction against the urging force of the clutch spring S. When the pressure-contacting force between the driving and driven clutch plates 6 and 7 is released, the rotational force inputted to the gear 1 and the clutch housing 2 is cut off and thus not transmitted to the shaft 3. Thus, the pressure-contact or the release between the plates 6 and 7 can be achieved by the axial movement of the push rod 9 and accordingly the pressure plate 5.

The pressure plate 5 is formed with several stopper portions 5*b*. The stopper portions 5*b* project from the pressure plate 5 to limit rotation of the pressure plate 5 relative to the clutch member 4. Each stopper portion 5*b* has a projected configuration and is fitted in a recess 4*a* formed on the inner peripheral surface of the clutch member 4. The stopper portion 5*b* limits the relative rotation between the pressure plate 5 and the clutch member 4.

Figure 2:
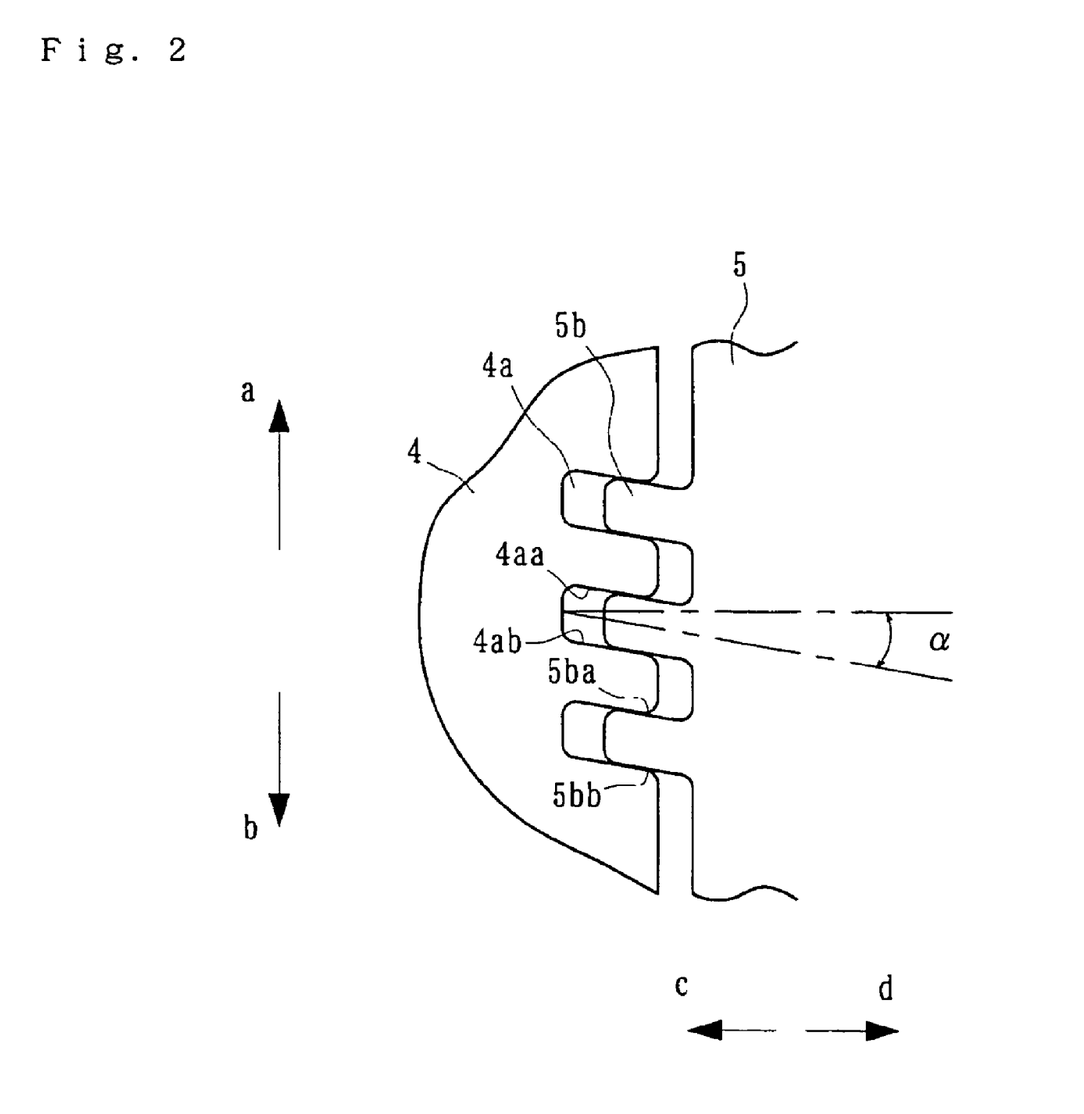
FIG. 2 is a schematic view showing a region near the stopper portions and recesses taken from a direction of an arrow A in FIG. 1.

Referring to FIG. 2, the stopper portions 5*b* and recesses 4*a* are arranged at a predetermined angle α inclined relative to the axis of the clutch member 4 (relative to the horizontal line in FIG. 2). In particular, each stopper portion 5*b* has cam surfaces 5*ba* and 5*bb* inclined at the angle α. Each recess 4*a* has cam surfaces 4*aa* and 4*ab* corresponding to the cam surfaces 5*ba* and 5*bb*, respectively. At these cam surfaces, the cam surfaces 5*bb* and 4*ab* form a pressure-contact assisting cam and the cam surfaces 5*ba* and 4*aa* form a back-torque limiting cam.

Under the condition where the rotational force inputted to the gear 1 and clutch housing 2 is transmitted to the shaft 3, via the clutch member 4, since the rotational force of a direction shown by an arrow "a" in FIG. 2 is applied to the clutch member 4, the pressure plate 5 is moved toward a direction shown by an arrow "c" by the camming action of the pressure-contact assisting cam. Thus the pressure-contact force between the driving clutch plates 6 and driven clutch plates 6 and 7 can be increased.

On the other hand, when the back-torque is caused in a direction shown by arrow "b" if the rotation speed of the shaft 3 exceeds that of the gear 1 and the clutch housing 2, the pressure plate 5 is moved toward a direction shown by an arrow "d" and thus the driving and driven clutch plates 6 and 7 are released. Thus, troubles of the power transmitting apparatus or power unit (e.g. an engine) which would be caused by the back-torque can be avoided.

According to the present invention, since the pressure-contact assisting cam or the back-torque limiting cam are arranged respectively at the recesses 4*a* on the inner peripheral wall of the clutch member 4 and the stopper portions 5*b*, it is possible to reduce the surface pressure applied to the cam surfaces and thus to avoid excessive loads which would otherwise be applied as compared with the prior art where the cam members with such function are arranged near the shaft 3. Accordingly, it is possible to eliminate any new additional parts made for example of a forged material and thus to reduce the manufacturing cost and the number of parts. In addition, it is possible to reduce the size of the power transmitting apparatus in view of its transmissible torque (i.e. a ratio of size/transmissible torque).

According to the power transmitting apparatus of the present invention, it is possible to obtain the pressure-contact assisting function and the back-torque limiting function only by changing the configuration of the stopper portions and the recesses for receiving the stopper portions of the prior art. Furthermore, since the stopper portions of the prior art also exhibit a function to prevent rotation of the pressure plate 5 and thus the stopper portions are made of a relatively high rigidity, no other process to increase the rigidity is required. Accordingly, the present invention can be easily applied to the power transmitting apparatus of the prior art.

In addition, it is preferable, in order to improve the wear resistance and the durability, to provide a surface treatment on the cam surfaces 5*bb* and 4*ab* which form the pressure-contact assisting cam and cam surfaces 5*ba* and 4*aa* which form the back-torque limiting cam. The surface treatment may include chrome plating or anode oxide coating etc. Such a surface treatment can improve slidability of the cam surfaces to achieve a good camming action as well as prevent generation of abrasion on the cam surfaces to extend the life of the power transmitting apparatus.

Although it may be possible to provide the surface treatment to the whole clutch member 4 and the pressure plate 5, the surface treatment may be applied only on the cam surfaces and may be sufficient. Also, the surface treatment may be provided to either one of the pressure-contact assisting cam or the back-torque limiting cam.

Figure 3:
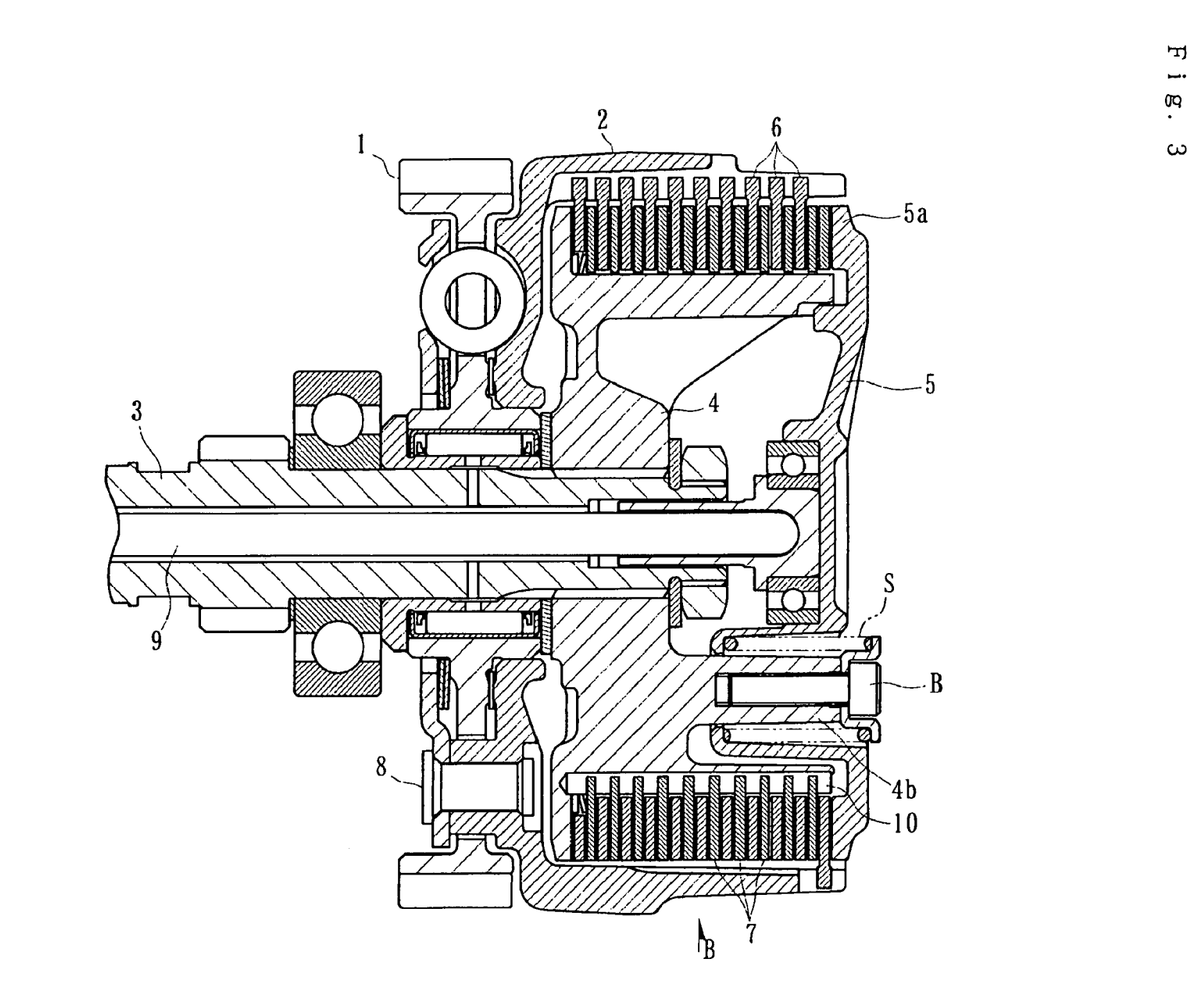
FIG. 3 is a longitudinal section view of a power transmitting apparatus according to a second embodiment of the present invention.

According to a second embodiment of the present invention, similar to the first embodiment, the power transmitting apparatus of the second embodiment is mounted on a vehicle such as a four wheel driving vehicle to arbitrarily transmit or cut off the driving force of an engine and transmission to or from the front wheels. As shown in FIG. 3, the power transmitting apparatus of the present invention comprises a gear (input member) 1, a clutch housing 2, a shaft (output member) 3, a clutch member 4, and a pressure plate 5 etc. Driving clutch plates 6 are connected to the clutch housing 2 and driven clutch plates 7 are connected to the clutch member 4. Structural elements that are the same as those in the first embodiment are designated by the same reference numerals as those used in the first embodiment and a detailed description will be omitted.

Figure 4:
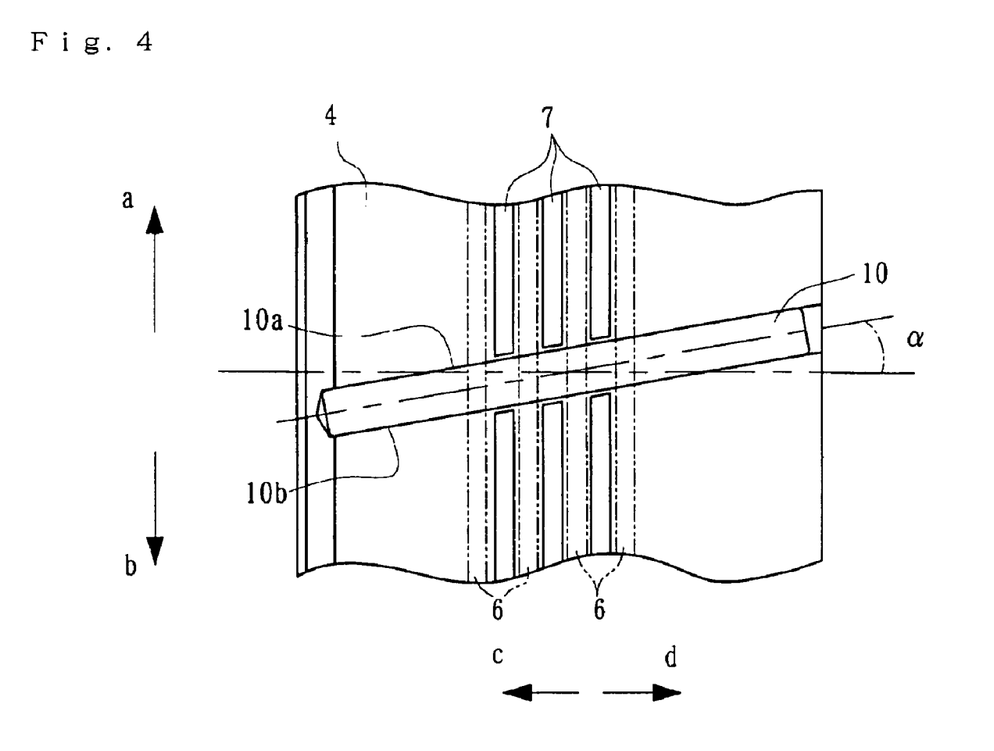
FIG. 4 is a schematic view showing fitting portions between a clutch member and driven clutch plates taken from a direction of an arrow B in FIG. 3.
Figure 5:
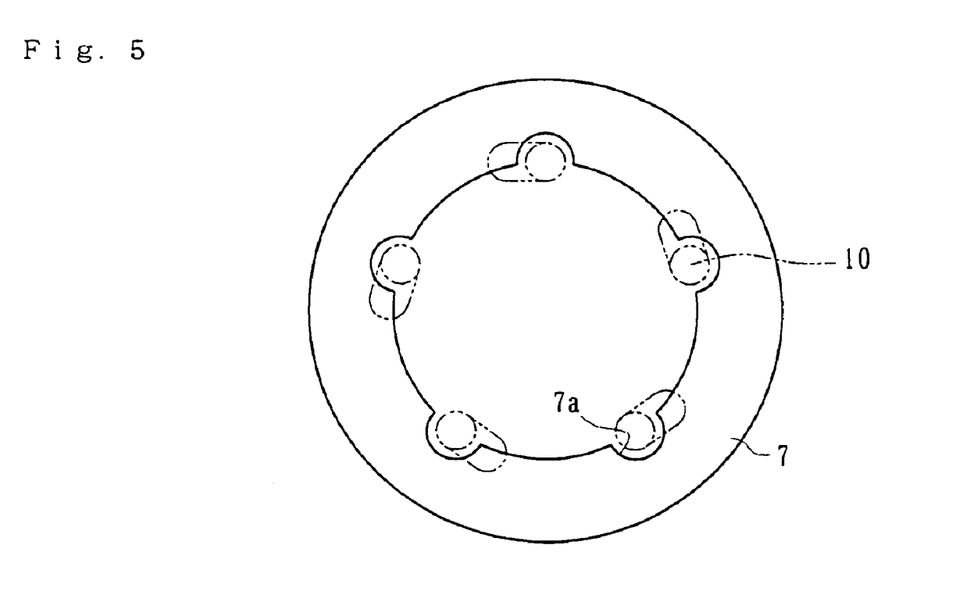
FIG. 5 is a plan view of a driven clutch plate used in a power transmitting apparatus of the present invention.

The fitting portion between the clutch member 4 and the driven clutch plates 7 is formed by steel fitting pins 10 mounted on the outer peripheral wall. Each pin 10 is arranged at a predetermined angle α inclined relative to the axis of the clutch member 4 as shown in FIG. 4. Each driven clutch plate 7 is formed with notches 7*a* where the pins 10 are fitted as shown in FIG. 5. Thus, each driven clutch 7 is driven and rotated by the fitting pins 10 when the clutch member 4 is rotated.

Since the fitting pin 10 is arranged at an inclination of the predetermined angle α, its inclined surface 10*a* forms the pressure-contact assisting cam and another inclined surface 10*b* forms the back-torque limiting cam. Under the condition where the rotational force inputted to the gear 1 and the clutch housing 2 is transmitted to the shaft 3 via the clutch member 4, since the rotational force of a direction shown by an arrow "a" in FIG. 4 is applied to the clutch member 4, the driven clutch plates 7 are moved toward a direction shown by an arrow "c" (a same direction as the urging direction of the pressure plate 5) by the camming action of pressure-contact assisting cam. Thus the pressure-contact force between the driving and driven clutch plates 6 and 7 can be increased.

On the other hand, when the back-torque is caused in a direction shown by an arrow "b", if the rotation speed of the shaft 3 exceeds that of the gear 1 and the clutch housing 2, the pressure plate 5 is moved toward a direction shown by an arrow "d" (an opposite direction to the urging direction of the pressure plate 5). Thus, the driving and driven clutch plates 6 and 7 are released. Accordingly, troubles of the power transmitting apparatus or power unit (e.g. an engine) which would be caused by the back-torque can be avoided.

According to the second embodiment, since the fitting portion (fitting pin 10), positioned at the outer peripheral wall of the clutch member 4, is formed with the pressure-contact assisting cam and the back-torque limiting cam, it is possible to further reduce the surface pressure applied to the cam surface even when compared with the first embodiment where both cam surfaces are formed on the inner peripheral wall of the clutch member 4 and thus to further effectively avoid the application of excessive load. This is achieved by providing only the fitting pins 10 instead of the splines of the prior art. Thus, it is possible to eliminate any new additional part made for example of a forged material and thus to reduce the manufacturing cost, as well as the number of parts. Similarly to the first embodiment, it is also possible to reduce the size of the power transmitting apparatus in view of its transmissible torque (a ratio of size/transmissible torque).

Further according to the second embodiment, since the fitting portions where the driven clutch plates 7 are fitted are made of steel, it has sufficient strength although the offset load is applied from the driven clutch plates 7 (in particular the notches 7a) to the fitting portions and thus it is possible to improve the durability of the power transmitting apparatus. The fitting pins 10 may be made of any material other than steel if it has a higher rigidity than that of the clutch member 4. Similarly to the first embodiment, it is preferable to provide surface treatment on the inclined surfaces 10a and 10b of the fitting pins 19 to improve the wear resistance and the durability. It is preferable to surface treat the entire fitting pins 10.

Figure 6:
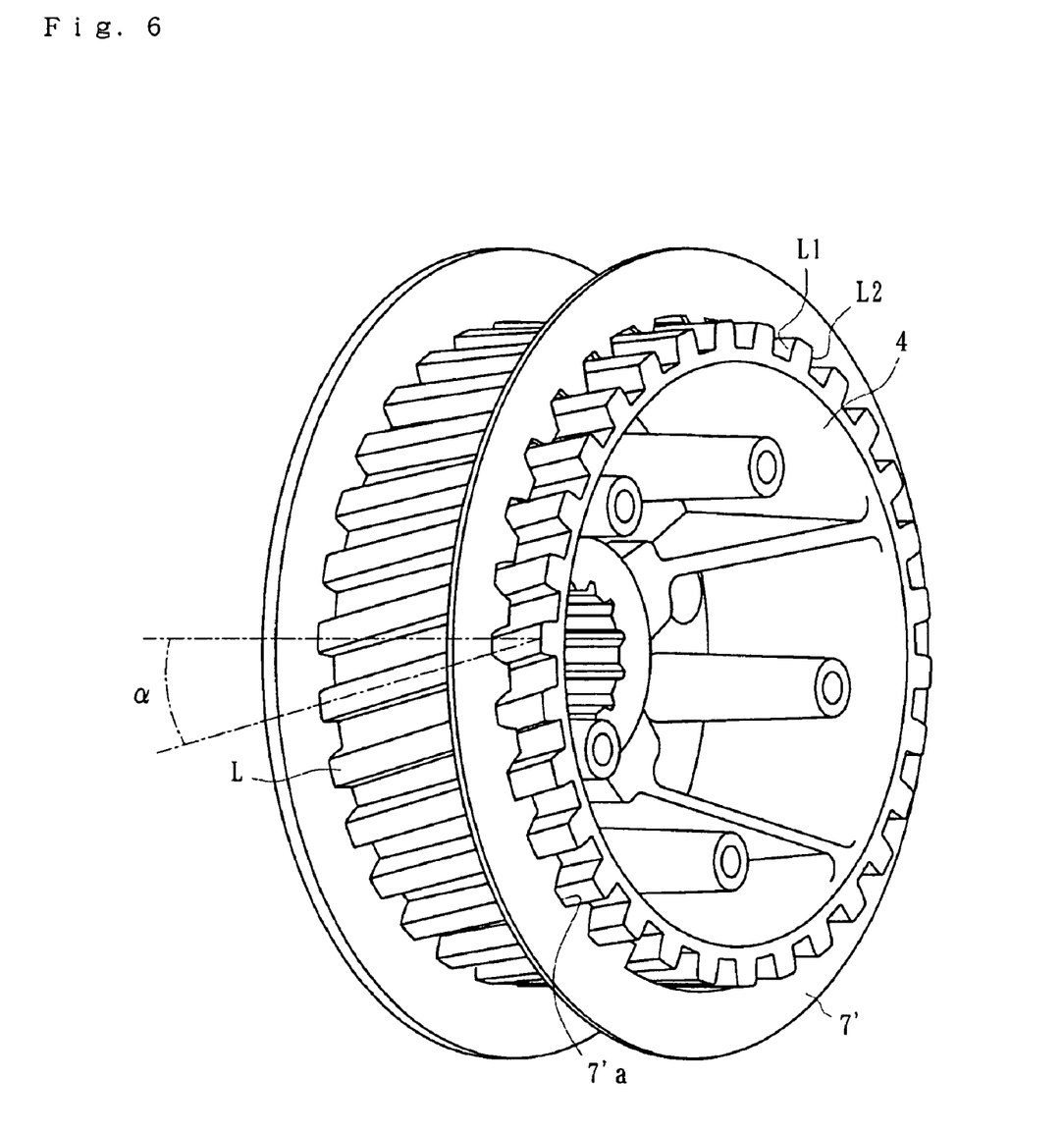
FIG. 6 is a perspective view of a clutch member and driven clutch plates used in a power transmitting apparatus of another embodiment of the present invention.

Although in the second embodiment, the fitting portions between the clutch member 4 and the driven clutch plates 7 are formed by separate members (i.e. pins 10) separated from the clutch member 4, the fitting portions may be formed as a plurality of splines (L). The splines (L) are formed on the outer peripheral wall of the clutch member 4 integral with and inclined at a predetermined angle α as shown in FIG. 6. With engagement of each spline (L) and a notch 7'a formed in the driven clutch plate 7', one inclined surface L1 (L2) functions as the pressure-contact assisting cam and the other inclined surface L2 (L1) functions as the back-torque limiting cam. Similar to the embodiments above, it is also preferable in this case, to provide a surface treatment on one inclined surface L1 which form the pressure-contact assisting cam and the other inclined surface L2 which form the back-torque limiting cam. Of course, it is possible to provide the surface treatment on the whole clutch member 4 including splines L.

Although the present invention has been described with reference to the preferred embodiment, the present invention is not limited to the illustrated explanations. For example in the first embodiment, it is possible to form either one of the pressure-contact assisting cam comprising the cam surfaces 5bb and 4ab or the back-torque limiting cam comprising the cam surfaces 5ba and 4aa. That is, it is possible, in the case in which only the pressure-contact assisting cam, to form the cam surfaces 5ba and 4aa with a wall surface (a wall surface axially (i.e. horizontally) extending wall surface) substantially vertically upstanding from its bottom without any inclination as well as in the case in which only the back-torque limiting cam, to form the cam surfaces 5bb and 4ab with a wall surface substantially vertically upstanding from its bottom without any inclination.

In the second embodiment, it is possible to replace the fitting pins 10 with those having rectangular cross-sectional configuration. However it is necessary to make the configuration of the notch of the driven clutch plate 7 the same as that of the fitting pin. The power transmitting apparatus of the present invention can be applied to a power transmitting apparatus of multiple disc clutch type used to a three or four wheeled buggy, machines for multiple use etc. other than four wheel drive vehicle.

The power transmitting apparatus of the present invention can be applied to those having different outline configurations or additional functions if they are those each having clutch member provided with the pressure-contact assisting cam or the back-torque limiting cam.

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or their equivalents.

What is claimed is:

1. A power transmitting apparatus comprising:
   a clutch housing rotatable together with an input member and having a plurality of driving clutch plates;
   a clutch member connected to an output member and having a plurality of driven clutch plates alternately arranged between the driving clutch plates of the clutch housing;
   a rotational force inputted to the input member can be transmitted to or cut off from the output member via pressure-contact or release between the driving clutch plates and driven clutch plates, said clutch member including pressure-contact assisting cams for increasing the pressure-contacting force between the driving clutch plates and driven clutch plates when a transmission of the rotational force inputted to the input member to the output member is achieved and including a back-torque limiting cams for releasing the connection between the driving clutch plates and the driven clutch plates when the rotation speed of the output member has been exceeded that of the input member; and
   a pressure plate mounted on the clutch member and moveable in an axial direction of the clutch member for carrying out the pressure-contact or release of the driving clutch plates and the driven clutch plates via the axial movement relative to the clutch member; and
   stopper portions projecting from the pressure plate and fitted in recesses formed on the inner peripheral surface of the clutch member for limiting the rotation of the pressure plate relative to the clutch member.

2. The power transmitting apparatus of claim 1 wherein said recesses formed on the clutch member and the stopper portions fitted in the recesses are formed with the pressure-contact assisting cams for moving the pressure plate toward the clutch member to increase the pressure-contacting force between the driving clutch plates and driven clutch plates when a condition in which the rotational force inputted to the input member is achieved and can be transmitted to the output member, and provided with the back-torque limiting cams for moving the pressure plate away from the clutch member to release the connection between the driving clutch plates and the driven clutch plates when the rotation speed of the output member has exceeded that of the input member.

3. The power transmitting apparatus of claim 1 wherein the pressure-contact assisting cams and the back-torque limiting cams are formed at fitting portions of the clutch member in which the driven clutch plates are fitted.

4. The power transmitting apparatus of claim 3 wherein the fitting portions of the clutch member are formed by a member separate from the clutch member and having higher rigidity than that of the clutch member.

5. The power transmitting apparatus of claim 1 wherein at least one of the pressure-contact assisting cams or the back-torque limiting cams is surface treated to improve the wear resistance and the durability.

* * * * *